(12) United States Patent
Doorenbos et al.

(10) Patent No.: US 7,648,271 B2
(45) Date of Patent: Jan. 19, 2010

(54) SYSTEMS AND METHODS FOR TEMPERATURE MEASUREMENT USING N-FACTOR COEFFICIENT CORRECTION

(75) Inventors: Jerry L. Doorenbos, Tucson, AZ (US); Marco A. Gardner, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 268 days.

(21) Appl. No.: 11/738,595

(22) Filed: Apr. 23, 2007

(65) Prior Publication Data

US 2008/0259989 A1 Oct. 23, 2008

(51) Int. Cl.
*G01K 7/00* (2006.01)
*G01K 15/00* (2006.01)

(52) U.S. Cl. ......................... 374/178; 374/170; 374/1; 327/512

(58) Field of Classification Search ............... 374/1, 374/170, 178; 327/512
See application file for complete search history.

(56) References Cited

U.S. PATENT DOCUMENTS

| | | | |
|---|---|---|---|
| 5,195,827 A | 3/1993 | Audy | |
| 5,867,012 A | 2/1999 | Tuthill | |
| 5,982,221 A | 11/1999 | Tuthill | |
| 6,097,239 A | 8/2000 | Miranda, Jr. et al. | |
| 6,133,753 A | 10/2000 | Thomson et al. | |
| 6,164,442 A | 12/2000 | Stravitz | |
| 6,554,469 B1* | 4/2003 | Thomson et al. ............ 374/178 |
| 7,029,171 B2* | 4/2006 | Tesi et al. ................... 374/1 |
| 2006/0093016 A1* | 5/2006 | McLeod et al. ............ 374/178 |
| 2008/0095213 A1* | 4/2008 | Lin et al. .................... 374/170 |

OTHER PUBLICATIONS

U.S. Appl. No. 11/738,566, filed Apr. 23, 2007, Doorenbos et al.
U.S. Appl. No. 11/738,571, filed Apr. 23, 2007, Gardner et al.
U.S. Appl. No. 11/738,584, filed Apr. 23, 2007, Gardner et al.
Analog Devices Data Sheet, +/− 1 C Remote and Local System Temperature Monitor (ADM1032), 2005, printed from analog.com, May 24, 200.
Analog Devices Data Sheet, +/− C Temperature Monitor with Series Resistance Cancellation (ADT7461), 2005, printed from analog.com, May 24, 2007.

(Continued)

*Primary Examiner*—Gail Verbitsky
*Assistant Examiner*—Mirellys Jagan
(74) *Attorney, Agent, or Firm*—John J. Patti; Wade J. Brady, III; Frederick J. Telecky, Jr.

(57) ABSTRACT

Various systems and methods for temperature measurement are disclosed. For example, some embodiments of the present invention provide temperature measurement systems. Such temperature measurement systems include a variable current source and a diode connected transistor. The variable current source is capable of applying two or more distinct currents to the diode connected transistor. The currents result in a different base-emitter voltage on the diode connected transistor. The systems further include an n-factor coefficient register and an analog to digital converter. The analog to digital converter is operable to receive two of the base-emitter voltages created by applying the different currents, and to provide a digital output based at least in part on a value stored in the n-factor coefficient register and the two base-emitter voltages.

18 Claims, 5 Drawing Sheets

OTHER PUBLICATIONS

Maxim Data Sheet, Remote/Local Temperature Sensor with SMBus Serial Interface, (MAX1617A), Jan. 1999, printed from www.maxim-ic.com, May 24, 2007.

Pertijs et al, "A Cmos Smart Temperature Sensor" IEEE J. Solid-State Circuits, vol. 40, No. 12, Dec. 2005.

SMSC Data Sheet 1 Degree D Triple SMbus Sensor with Resistance Error Correction, (EMC1033), Jan. 2007, printed from www.smsc.com.

Analog Devices Data Sheet, 10-Bit Temperature Sensor (AD7416) and Four Single ADCs (AD7417/AD7418), 2004, printed from www.analog.com Apr. 10, 2007.

Analog Devices Data Sheet TM P401, Low Power Programmable Temperature Controller, 2002, printed from www.analog.com Apr. 10, 2007.

Texas Instruments Data Sheet TMP401, +/−1C Programmable Remote/Local Digital Out Temperature Sensor, Aug. 2006, printed from www.ti.com Apr. 10, 2007.

Doorenbos et al., Texas Instruments Data Sheet TMP411, +/−1C Remote and Local Temperature Sensor with N-Factor and Series Resistance Correction, Feb. 2007.

SMSC Data Sheet, EMC1023 1C Triple Temperature Sensor with Resistance Error Correction, Dec. 3, 2004.

* cited by examiner

SYSTEMS AND METHODS FOR TEMPERATURE MEASUREMENT USING N-FACTOR COEFFICIENT CORRECTION

BACKGROUND OF THE INVENTION

The present invention is related to temperature measurement, and more particularly to temperature measurements using a transistor or diode as a sensor.

Temperature measurement using a transistor as a sensor is a common application in the semiconductor area. Such a temperature measurement is done by applying two different currents to the transistor resulting in two different base-emitter voltages. The difference between the two base-emitter voltages is proportional the absolute temperature of the transistor. Turning to FIG. 1a, an example of such a temperature measurement circuit 100 is shown. Temperature measurement circuit 100 includes a transistor 120 that is used as a temperature sensor. The collector and the base of transistor 120 are electrically coupled to a variable current source 110. Further, the base of transistor 120 is electrically coupled to one input of an analog to digital converter 130, and the emitter of transistor 120 is electrically coupled to another input of analog to digital converter 130. Analog to digital converter 130 is operable to receive the voltages at the base and emitter of transistor 120, and to provide a $\Delta V_{be}$ output 135 representing the difference between two different base to emitter voltages. $\Delta V_{be}$ output 135 is provided to a temperature calculation circuit 140 that provides an uncorrected temperature output 145.

As previously mentioned, the difference between the two base-emitter voltages is proportional to the absolute temperature of transistor 120. The following equation defines the relationship between the difference between base-emitter voltage measurements and absolute temperature:

$$\Delta V_{be} = V_{be2} - V_{be1} = n*kT/q*\ln(I_2/I_1).$$

The 'n' term is known as the non-ideality factor or emission coefficient is assumed to be a constant (n=1.008) for diodes and transistors. Most sensors expect the n-factor to have a constant value of 1.008. In reality, the non-ideality factor is a function of the structure and fabrication process of transistor 120 and as semiconductor processes move to smaller geometry transistor 120 becomes something other than the expected value of 1.008. The following equation represents the temperature error seen if the non-ideality factor is different that the presumed 1.008:

$$T_{error} = ((n-1.008)/1.008)*273.15*T_{ideal}.$$

To correct for the aforementioned temperature error, some circuits have included a backend offset circuit designed to add or subtract a calculated constant from uncorrected temperature 145 and thereby achieve a corrected temperature. FIG. 1b shows an example of one such temperature calculation circuit 101. As shown, temperature calculation circuit 101 is substantially similar to temperature calculation circuit 100, except for the addition of a temperature offset adder circuit 150. Temperature offset adder circuit 150 receives uncorrected temperature 145 and a programmed temperature offset input 147. The two inputs are added together to create a corrected temperature output 155. While such an offset approach can effectively correct calculation errors at a given point on an operational curve, the inaccuracy of the calculated temperature still exists as operation moves farther from the aforementioned offset corrected point on the operational curve.

Thus, for at least the aforementioned reasons, there exists a need in the art for advanced systems and devices for temperature measurement.

BRIEF SUMMARY OF THE INVENTION

The present invention is related to temperature measurement, and more particularly to temperature measurements using a transistor or diode as a sensor.

Various systems and methods for temperature measurement are disclosed. Some embodiments of the present invention provide temperature measurement systems. Such temperature measurement systems include a variable current source and a diode connected transistor. The variable current source is capable of applying two or more distinct currents to the diode connected transistor. The currents result in a different base-emitter voltage on the diode connected transistor. The systems further include an n-factor coefficient register and an analog to digital converter. The analog to digital converter is operable to receive two of the base-emitter voltages created by applying the different currents, and to provide a digital output based at least in part on a value stored in the n-factor coefficient register and the two base-emitter voltages.

In some embodiments of the present invention, the gain of the analog to digital converter corresponds to the value stored in the n-factor coefficient register. In some such cases, the analog to digital converter is a first order integrating converter and the number of samples processed by the first order integrating converter is controlled at least in part based on the value stored in the n-factor coefficient register. In particular instances of the aforementioned embodiments, an ideal gain of the first order integrating converter is approximately three hundred. In various instances of the aforementioned embodiments, the first order integrating converter is a differential analog to digital converter.

In some instances of the aforementioned embodiments, the temperature measurement system further includes a temperature calculation module that is operable to calculate a temperature based on the digital output. In various instances of the aforementioned embodiments, the analog to digital converter is operable to perform a number of samples corresponding to the value stored in the n-factor coefficient register. In particular instances of the aforementioned embodiments, the n-factor coefficient register is accessible via a two wire interface that may include a data line and a clock line.

Other embodiments of the present invention provide methods for temperature measurement. The methods include providing a temperature measurement circuit. The temperature measurement circuit is operated and a temperature error is determined. An n-factor adjustment is calculated to compensate for the temperature error, and the calculated n-factor adjustment is written to an n-factor coefficient register. In some instances of the aforementioned embodiments, determining the temperature error includes: operating the temperature measurement circuit using a standard n-factor value; measuring a first temperature of the temperature measurement circuit using an external measurement sensor; calculating a second temperature of the temperature measurement circuit using the first base-emitter voltage and the second base-emitter voltage; and calculating a difference between the first temperature and the second temperature.

In some instances of the aforementioned embodiments, operating the temperature measurement circuit using a standard n-factor value includes operating the circuit with a zero value in the n-factor coefficient register. In other instances of the aforementioned embodiments, operating the temperature measurement circuit using a standard n-factor value includes operating the circuit with the standard n-factor value in the n-factor coefficient register. In various instances of the aforementioned embodiments, the gain of the analog to digital converter corresponds to the n-factor adjustment. In some such cases, the n-factor adjustment is combined with the standard n-factor value, and the combined value governs the gain of the analog to digital converter.

Yet other embodiments of the present invention provide temperature measurement circuits. The temperature measurement circuits include a variable current source that is operable to provide a first current and a second current. The circuits further include a diode connected transistor that is electrically coupled to the variable current source. A first base-emitter voltage is exhibited when the first current is applied to the diode connected transistor, and a second base-emitter voltage is exhibited when the second current is applied to the transistor. The circuit further includes an n-factor coefficient register, and an analog to digital converter. A gain of the analog to digital converter corresponds (either directly or indirectly) to the value stored in the n-factor coefficient register. The analog to digital converter is operable to receive the first base-emitter voltage and the second base-emitter voltage, and is operable to provide a digital representation of a difference between the first base-emitter voltage and a digital representation of the second base-emitter voltage using the gain. In some cases, the circuits further include a temperature calculation module that is operable to calculate a temperature based on the digital representation of the first base-emitter voltage and the digital representation of the second base-emitter voltage.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to temperature measurement, and more particularly to temperature measurements using a transistor or diode as a sensor.

Various systems and methods for temperature measurement are disclosed. Some embodiments of the present invention provide temperature measurement systems. Such temperature measurement systems include a variable current source and a diode connected transistor. The variable current source is capable of applying two or more distinct currents to the diode connected transistor. The currents result in a different base-emitter voltage on the diode connected transistor. The systems further include an n-factor coefficient register and an analog to digital converter. The analog to digital converter is operable to receive two of the base-emitter voltages created by applying the different currents, and to provide a digital output based at least in part on a value stored in the n-factor coefficient register and the two base-emitter voltages.

In some embodiments of the present invention, the gain of the analog to digital converter corresponds to the value stored in the n-factor coefficient register. As used herein, the phrase "n-factor coefficient register" is used in its broadest sense to mean any register or lookup table that may either include the number of samples to be taken, or some offset or number used to generate the number of samples to be taken. In some such cases, the analog to digital converter is a first order integrating converter and the number of samples processed by the first order integrating converter is controlled at least in part based on the value stored in the n-factor coefficient register. In particular instances of the aforementioned embodiments, an ideal gain of the first order integrating converter is approximately three hundred. In various instances of the aforementioned embodiments, the first order integrating converter is a differential analog to digital converter.

Figure 1A:
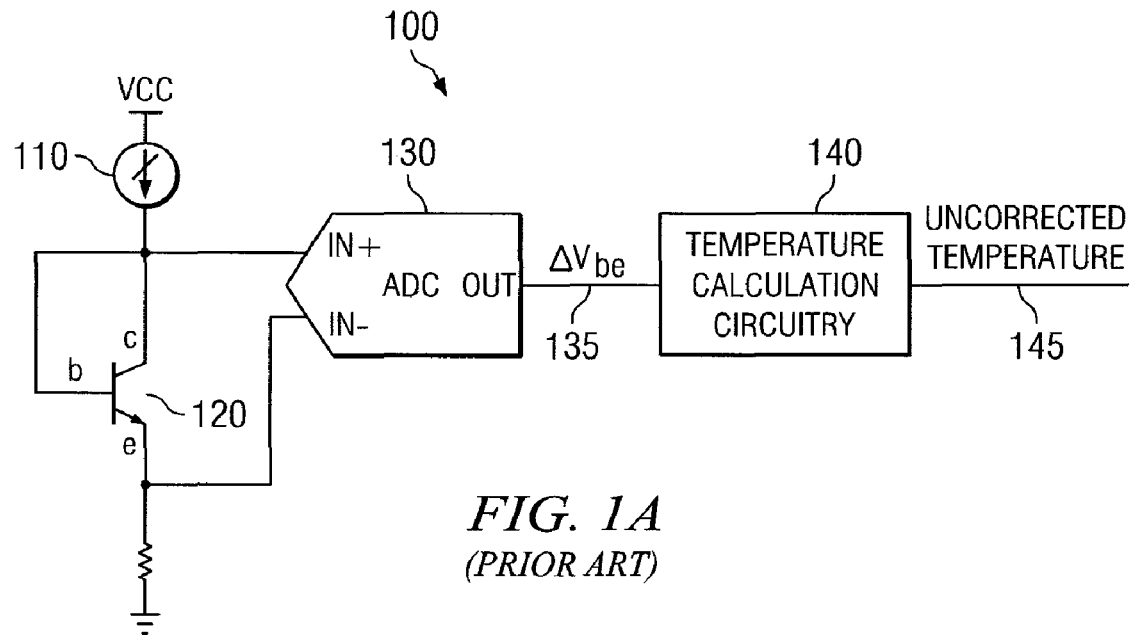
FIG. 1a depicts a simplified transistor based temperature measurement system.
Figure 1B:
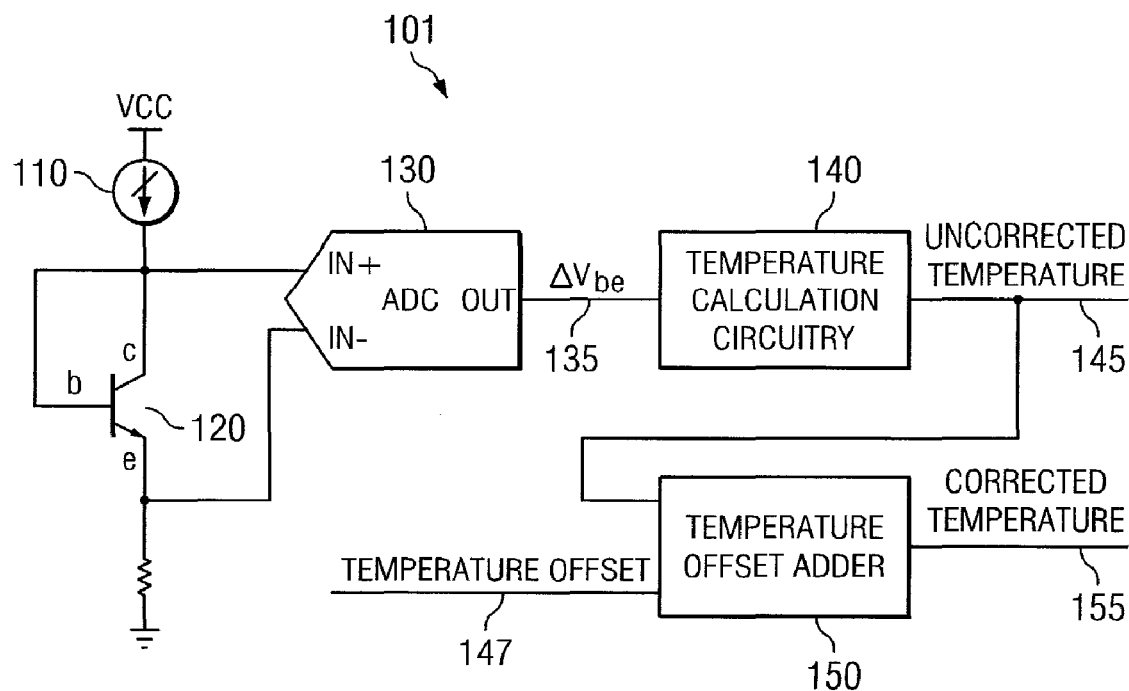
FIG. 1b shows the temperature measurement system of FIG. 1 including a prior art offset correction.
Figure 2:
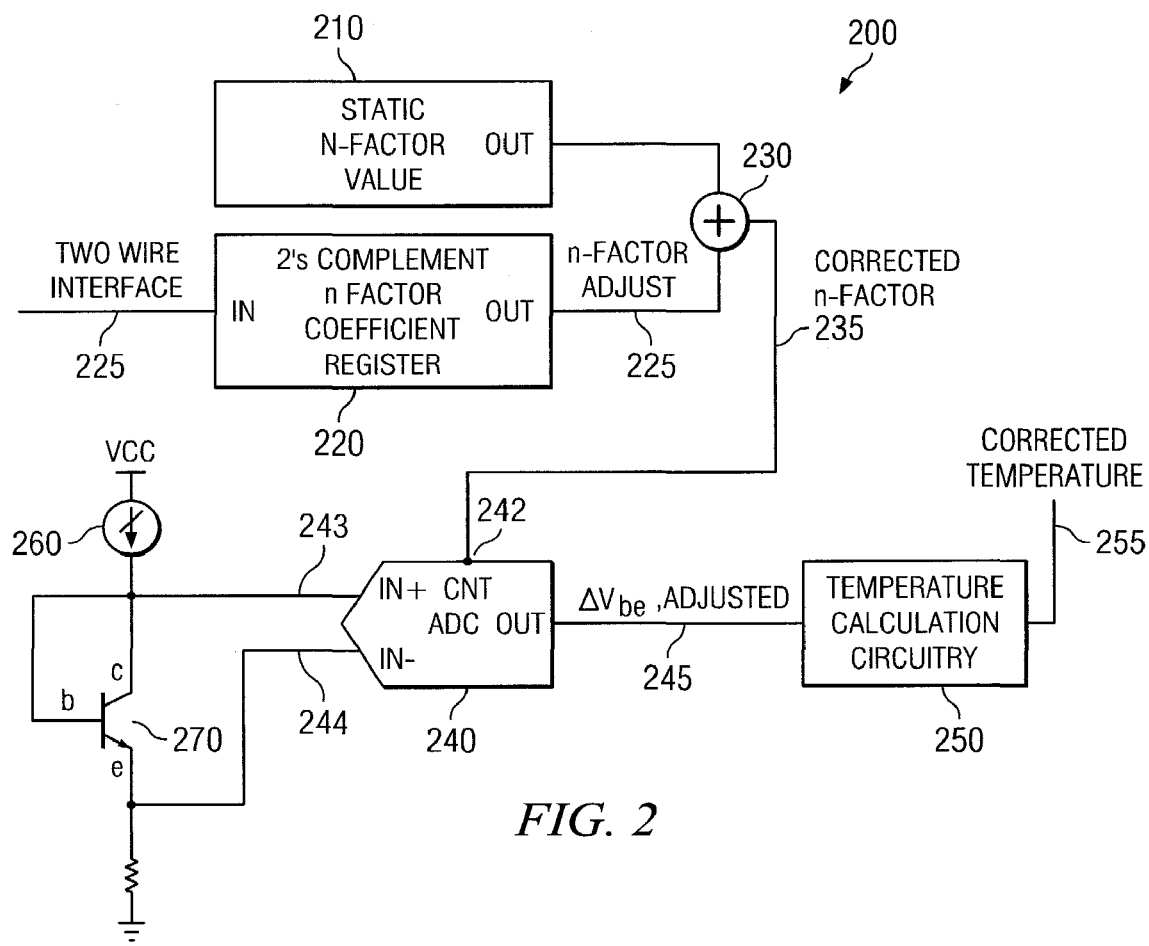
FIG. 2 is a conceptual diagram of a temperature measurement circuit including n-factor coefficient correction in accordance with one or more embodiments of the present invention.

Turning to FIG. 2, a conceptual diagram of a temperature calculation circuit 200 including an n-factor coefficient correction in accordance with one or more embodiments of the present invention is shown. Temperature measurement circuit 200 includes a transistor 270 that is diode connected and used as a temperature sensor. It should be noted that while the figure shows an NPN transistor, that other circuits in accordance with one or more embodiments of the present invention may utilize a PNP transistor. The collector and the base of transistor 270 are electrically coupled to a variable current source 260. Further, the base of transistor 270 is electrically coupled to a positive input 243 of an analog to digital converter 240, and the emitter of transistor 270 is electrically coupled to a negative input 244 of analog to digital converter 240. Analog to digital converter 240 is operable to receive the voltages at the base and emitter of transistor 270, and to provide a Delta $V_{be}$ output 245 representing the difference between two or more different base to emitter voltages adjusted for a corrected n-factor coefficient 235. It should be noted that the words Delta $V_{be}$ represents a difference between two or more base-emitter voltages respectively corresponding to two or more applied currents. The symbolic representation, $\Delta V_{be}$ does not necessarily imply a difference created by more than two base-emitter voltages. Corrected n-factor coefficient 235 is provided to analog to digital converter 240 via a control input 242 and is used to control the gain of analog to digital converter 240 as further discussed below.

Corrected n-factor 235 ($n_{corrected}$) is a non-ideality factor that is adjusted to compensate for characteristics particular to a given circuit. As shown, corrected n-factor 235 is created by combining a static n-factor value 210 and a value 225 ($n_{adjust}$) from an n-factor coefficient register 220. In some cases, static n-factor value 210 is a hard coded digital number that when used by analog to digital converter 240 represents a standard non-ideality factor (i.e., 1.008), and n-factor coefficient register 220 is programmed via a two wire interface 225 to include a coefficient ($n_{adjust}$) that when combined with static n-factor 210 provides corrected n-factor 235 to be used in calculating temperature. Two wire interface 225 may be any clock/data interface known in the art that is capable of transferring information to/from a register.

In some cases, the value programmed into n-factor coefficient register 220 is added to static n-factor value 210 using an adder 230. It should be noted, however, that in some embodiments of the present invention, a single n-factor coefficient register may be used such that the need for static n-factor value 210 and adder 230 are not needed. In such a case, the value programmed into the n-factor coefficient register is used directly as the corrected n-factor to be used in calculating temperature. Based on the disclosure provided herein, one of ordinary skill in the art will recognize a variety of approaches that may be used to program a corrected n-factor value into a temperature calculation circuit in accordance with one or more embodiments of the present invention.

Corrected n-factor 235 is particularly used to control the gain of analog to digital converter 240. The following equations demonstrate the analog to digital converter gain (ADC Gain) that corresponds to the value ($n_{adjust}$) programmed into n-factor coefficient register 220:

$$n_{corrected} = 1.008 * G/(G - n_{adjust}),$$

where G represents the ideal gain of the ADC and 1.008 is the standard non-ideality factor. Solving for $n_{adjust}$ yields:

$$n_{adjust} = G - G * 1.008 / n_{corrected}.$$

Thus, by adjusting the gain of analog to digital converter 240, a corrected n-factor may be effectively implemented. In such a case, the gain of analog to digital converter 240 is defined as:

$$ADC\ Gain = G - n_{adjust}.$$

By allowing a user to program a particular value 225 ($n_{adjust}$) into n-factor register 220, the non-ideality factor used in determining temperature may be modified to match the characteristics of a particular diode or transistor used as a temperature sensor. In some cases, analog to digital converter 240 may be a first order integrating converter with an ideal gain of approximately three hundred (300). Based upon the disclosure provided herein, one of ordinary skill in the art will recognize other converters and/or gains that may be used in relation to different embodiments of the present invention.

In operation, variable current source 260 is set to apply a first current to transistor 270 after which the base-emitter voltage ($V_{be}$) is detected. Subsequently, variable current source 260 is set to apply a second current to transistor 270 after which the base-emitter voltage ($V_{be}$) is again detected. The difference between the aforementioned base-emitter voltages is proportional to absolute temperature. In contrast to the prior art, however, delta $V_{be}$ output 245 from analog to digital converter 240 is adjusted to reflect corrected n-factor 235. In particular, the gain of analog to digital converter 240 is modified to implement corrected n-factor 235. Analog to digital converter 240 provides $\Delta V_{be,\ adjusted}$ to a temperature calculation circuit 250 that provides a corrected temperature output 255 in accordance with the following equation:

$$\Delta V_{be,\ adjusted} = n * kT/q * \ln(I_2/I_1).$$

It should be noted that temperature calculation circuit 250 may be implemented as an electrical circuit. Alternatively, temperature calculation circuit 250 may be implemented as software that is executable by a processor based system such as a computer. Based on the disclosure provided herein, one of ordinary skill in the art will recognize a variety of circuits, software, firmware, and/or combinations of the aforementioned that may be used to implement temperature calculation circuit 250. It should be noted that $\Delta V_{be,\ adjusted}$ is the delta base-emitter voltage converted using a corrected n-factor.

Corrected n-factor 235 compensates for non-idealities in a semiconductor device due to, for example, small geometries and the fabrication process used to manufacture transistor 270. As corrected n-factor 235 is used to modify the gain of analog to digital converter 240, the correction factor is used as a multiplicand and not merely an offset correction. By using a multiplicand instead of an offset correction, any correction operates across a broader operational range than that provided by simply adding an offset. In some embodiments of the present invention, the circuitry used to provide and utilize corrected n-factor 235 may be purely digital. Such embodiments provide relatively simple and low cost solutions to error compensation.

Figure 3:
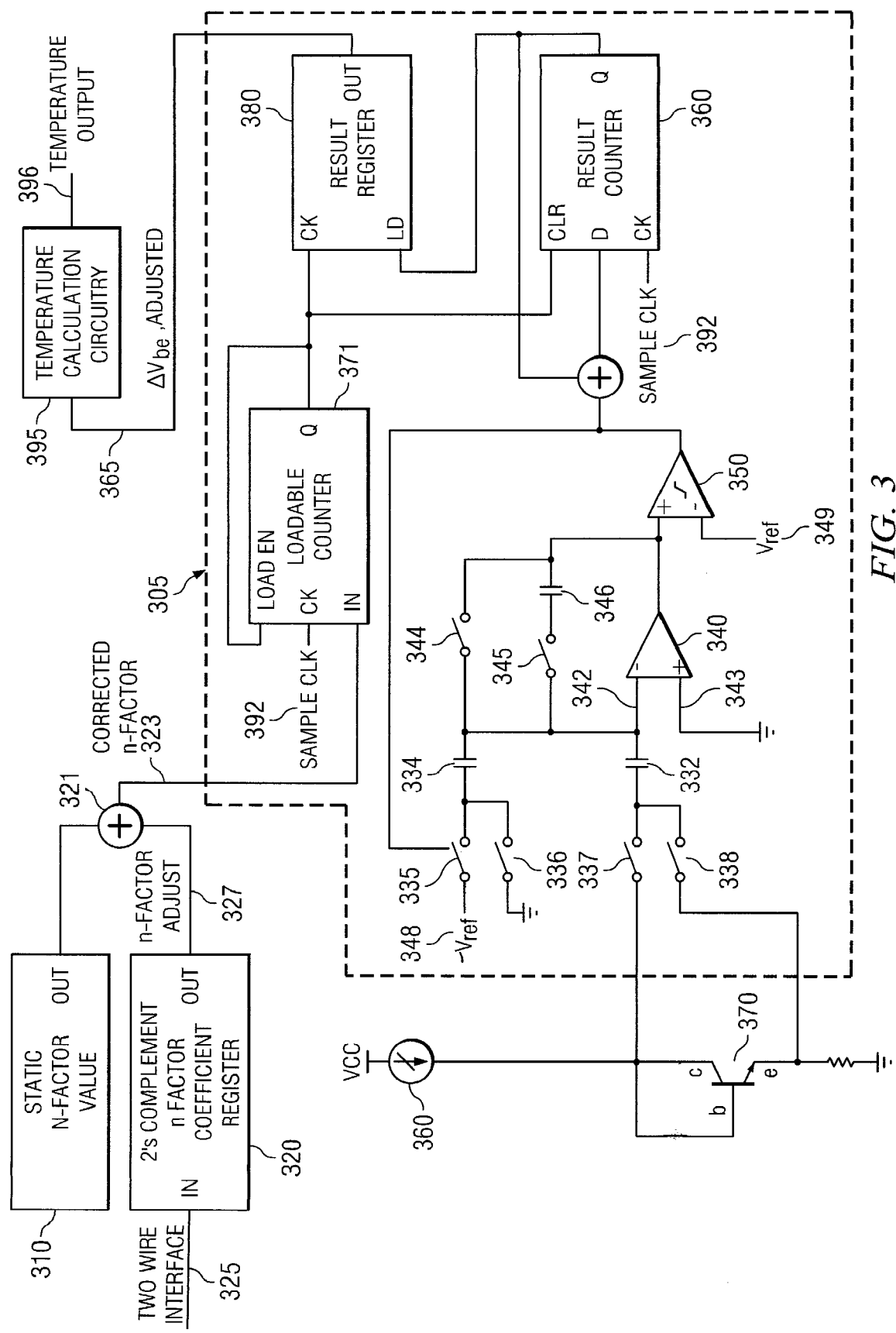
FIG. 3 shows a particular implementation of a temperature measurement circuit with n-factor coefficient correction in accordance with various embodiments of the present invention.

Turning to FIG. 3, one implementation of a temperature measurement circuit 300 is depicted with n-factor coefficient correction in accordance with various embodiments of the present invention. Temperature measurement circuit 300 includes a static n-factor value 310, an n-factor coefficient register 320, a temperature calculation circuit 395, and a first order integrating analog to digital converter 305. In addition, temperature measurement circuit 300 includes a transistor 370 that is diode connected and used as a temperature sensor. It should be noted that while the figure shows an NPN transistor, that other circuits in accordance with one or more embodiments of the present invention may utilize a PNP transistor. The collector and the base of transistor 370 are electrically coupled to a variable current source 360. Further, the base of transistor 370 is electrically coupled to an input of analog to digital converter 305 (i.e., a negative input 342 of an operational amplifier 340 via a switch 337 and an input sampling capacitor 332), and the emitter of transistor 370 is electrically coupled to the same ground as analog to digital converter 305.

Analog to digital converter 305 includes a loadable counter 371; a result counter 360; an operational amplifier 340; a comparator 350; switches 335, 336, 337, 338, 344 and 345; capacitors 332, 334 and 346; a voltage reference 349 and an inverted version of the aforementioned voltage reference 348; and result register 380. It should be noted that the inverted version of the voltage reference may be generated in any number of ways including, but limited to, applying a negative reference voltage, using a positive reference voltage and a defined sampling sequence, or the like. In particular, inverted voltage reference 335 is electrically coupled to a reference sample capacitor 334 via a switch 335. Reference sample capacitor 334 is also electrically coupled to ground via a switch 336, and to negative input 342 of operational amplifier 340. The base and collector of transistor 370 are electrically coupled to negative input 342 of operational amplifier 340 via a switch 337 and an input sample capacitor 332. Negative input 342 of operational amplifier 340 is also electrically coupled to ground via a switch 338. A positive input 343 of operational amplifier 340 is electrically coupled to ground. A switch 344 electrically couples the output of operational amplifier 340 to negative input 342, and a switch 345 and a feedback capacitor 346 electrically couples the output of operational amplifier 340 to negative input 342.

The output of operational amplifier 340 is also electrically coupled to an input of comparator 350. The other input of comparator 350 is electrically coupled to voltage reference 349. The output of comparator 350 is provided to result counter 360, and as a feedback to control switch 335 and switch 336. Result counter 360 counts up synchronously each time the output of comparator 350 is a logic '1' (i.e., each time the sample value is greater than reference voltage 349). The number of samples that are counted is equivalent to the value of corrected n-factor 323 as indicated by the value at the output of loadable counter 371. Once the output value of loadable counter 371 is a logic '0', the output value of result counter 360 is stored to result register 380 and result counter 360 is reset. The output (i.e., Delta $V_{be,\ adjusted}$ 365) of result register 380 is provided to a temperature calculation circuit 395. The value of Delta $V_{be,\ adjusted}$ 365 represents the difference between two or more different base-emitter voltages of transistor 370 adjusted for a corrected n-factor coefficient 323. Corrected n-factor coefficient 323 is provided to analog to digital converter 305 as an input to loadable counter 371. In this way, corrected n-factor 323 controls the number of samples processed by analog to digital converter 305, and therefore the gain of analog to digital converter 305.

Corrected n-factor 323 ($n_{corrected}$) is a non-ideality factor that may be adjusted to compensate for characteristics particular to a given circuit. As shown, corrected n-factor 323 is created by combining a static n-factor value 310 and the value 327 ($n_{adjust}$) from an n-factor coefficient register 320. In some cases, static n-factor value 310 is a hard coded digital number that when used by analog to digital converter 305 represents a standard non-ideality factor (i.e., 1.008), and n-factor coefficient register 320 is programmed via a two wire interface 325 to include a coefficient ($n_{adjust}$) that when combined with static n-factor 310 provides corrected n-factor 323 to be used in calculating temperature. Two wire interface 325 may be any clock/data interface known in the art that is capable of transferring information to/from a register.

In some cases, the value 327 programmed into n-factor coefficient register 320 is added to static n-factor value 310 using an adder 321. It should be noted, however, that in some embodiments of the present invention, a single n-factor coefficient register may be used such that the need for static n-factor value 310 and adder 321 are not needed. In such a case, the value programmed into the n-factor coefficient register is used directly as the corrected n-factor to be used in calculating temperature. Based on the disclosure provided herein, one of ordinary skill in the art will recognize a variety of approaches that may be used to program a corrected n-factor value into a temperature calculation circuit in accordance with one or more embodiments of the present invention.

As previously mentioned, corrected n-factor 323 is used to control the gain of analog to digital converter 305. In particular, corrected n-factor 323 controls the number of samples processed by analog to digital converter 305 before a result is logged in result register 380. In one particular embodiment of the present invention, static n-factor value represents an ideal gain for analog to digital converter 305 and the value 327 ($n_{adjust}$) programmed into n-factor coefficient register 320 is an offset to the static n-factor value. The following equations demonstrate the analog to digital converter gain (ADC Gain) that corresponds to the value ($n_{adjust}$) programmed into n-factor coefficient register 320:

$$n_{corrected} = 1.008 * G/(G - n_{adjust}),$$

where G represents the ideal gain of the ADC and 1.008 is the standard non-ideality factor. Solving for $n_{adjust}$ yields:

$$n_{adjust} = G - G * 1.008/n_{corrected}.$$

Thus, by adjusting the gain of analog to digital converter 340, a corrected n-factor may be effectively implemented. In such a case, the gain of analog to digital converter 340 is defined as:

$$ADC\ Gain = G - n_{adjust}.$$

By allowing a user to program a particular value ($n_{adjust}$) into n-factor register 320, the non-ideality factor used in determining temperature may be modified to match the characteristics of a particular diode or transistor used as a temperature sensor. In some cases, analog to digital converter 305 may be a first order integrating converter with an ideal gain of approximately three hundred (300). Based upon the disclosure provided herein, one of ordinary skill in the art will recognize other converters and/or gains that may be used in relation to different embodiments of the present invention.

In operation, variable current source 360 is set to apply a first current to transistor 370 after which the base-emitter voltage ($V_{be}$) is detected. In particular, after applying the first current from variable current source 360, switch 337 and switch 344 are closed allowing input sample capacitor 332 to charge to the value on the base of transistor 370. The charge from input sample capacitor 332 is then transferred to feedback capacitor 346 by opening switch 337 and switch 344, and closing switch 345 and switch 338. This results in an output from operational amplifier 340 at the input of comparator 350. In a subsequent cycle, a second current is applied to transistor 370 and the voltage at the base of transistor 370 is sampled by closing switch 338 and switch 344. Once charging is complete, charge is transferred from input sample capacitor 332 to feedback capacitor 346 by closing switch 337 and switch 345. At this point the output of operational amplifier 340 is a difference between the base-emitter voltage corresponding to the first current, and that corresponding to the second current. Where the value of capacitor of 332 and the value of capacitor 346 are the same, the gain of operational amplifier 340 is unity and the output is approximately equal to the difference between the aforementioned first and second base-emitter voltages. The output of operational amplifier 350 is compared with voltage reference 349. Where the result is a logic '0', result counter 360 is not incremented. In the next pass, the sequence of first and second currents are applied resulting in a value of approximately double the voltage at the base of transistor 370 at the output of operational amplifier 340. Again, where the result is a logic '0', result counter 360 is not incremented and substantially the same process is repeated until the result of a logic '1' is achieved.

Alternatively, on any pass where the result of the comparison is a logic '1', result counter 360 is incremented. Further, where the result is a logic '1', the negative version of the voltage reference 348 is sampled along with the voltage at the base of transistor 370 on the next pass. This is done by closing switch 335, switch 337 and switch 344. This causes charge to build up on reference sample capacitor 334 representing the negative reference voltage, and charge to build up on input sample capacitor 332 representing the voltage at the base of transistor 370. The charge from both of the aforementioned capacitors is transferred to feedback capacitor 346 by closing switch 336, switch 338 and switch 345. By continually resampling the voltage at the base of transistor 370 and sampling the negative voltage reference any time a logic '1' is noted, the following residue will remain for a counter value of X and a number of iterations N:

$$Residue = NV_{in} - XV_{ref},$$

where $V_{in}$ is the difference between two or more base-emitter voltages. The digital value representing the difference between the two base-emitter voltages is that maintained on result counter 360 at the end of the process. The process is continued for the number of samples loaded into loadable counter 371 (i.e., corrected n-factor 323).

During the sampling period, variable current source 360 is initially set to apply a first current to transistor 370 and subsequently to apply a second current. The first and second currents result in respective base-emitter voltages. By repeatedly applying two different currents to transistor 370, an integration of the difference between the respective base-emitter voltages is achieved in result counter 360. The output of result counter 360 is ultimately registered in result register 380 as Delta $V_{be,\ adjusted}$ 365. This output is used to calculate temperature based on the following equation:

$$\Delta V_{be,\ adjusted} = n^* kT/q^* \ln(I_2/I_1).$$

In contrast to the prior art, however, delta $V_{be}$ output 365 from analog to digital converter 305 is adjusted to reflect corrected n-factor 323. In particular, the gain of analog to digital converter 305 is modified to implement corrected n-factor 323. It should be noted that temperature calculation circuit 395 may be implemented as an electrical circuit. Alternatively, temperature calculation circuit 395 may be implemented as software that is executable by a processor based system such as a computer. Based on the disclosure provided herein, one of ordinary skill in the art will recognize a variety of circuits, software, firmware, and/or combinations of the aforementioned that may be used to implement temperature calculation circuit 395. Corrected n-factor 323 compensates for non-idealities in a semiconductor device due to, for example, small geometries and the fabrication process used to manufacture transistor 370. As corrected n-factor 323 is used to modify the gain of analog to digital converter 305, the correction factor is used as a multiplicand and not merely an offset correction. By using a multiplicand instead of an offset correction, any correction operates across a broader operational range than that provided by simply adding an offset. In some embodiments of the present invention, the circuitry used to provide and utilize corrected n-factor 323 may be purely digital. Such embodiments provide relatively simple and low cost solutions to error compensation.

It should be noted that analog to digital converter 305 may be implemented as another type of analog to digital converter. For example, analog to digital converter 305 may be implemented as a fully differential analog to digital converter where the base of transistor is electrically coupled to one differential input of the differential analog to digital converter, and the emitter of transistor 370 is electrically coupled to the other differential input of the differential analog to digital converter. Based on the disclosure provided herein, one of ordinary skill in the art will recognize other types of analog to digital converters that may be used in relation to various embodiments of the present invention.

Figure 4:
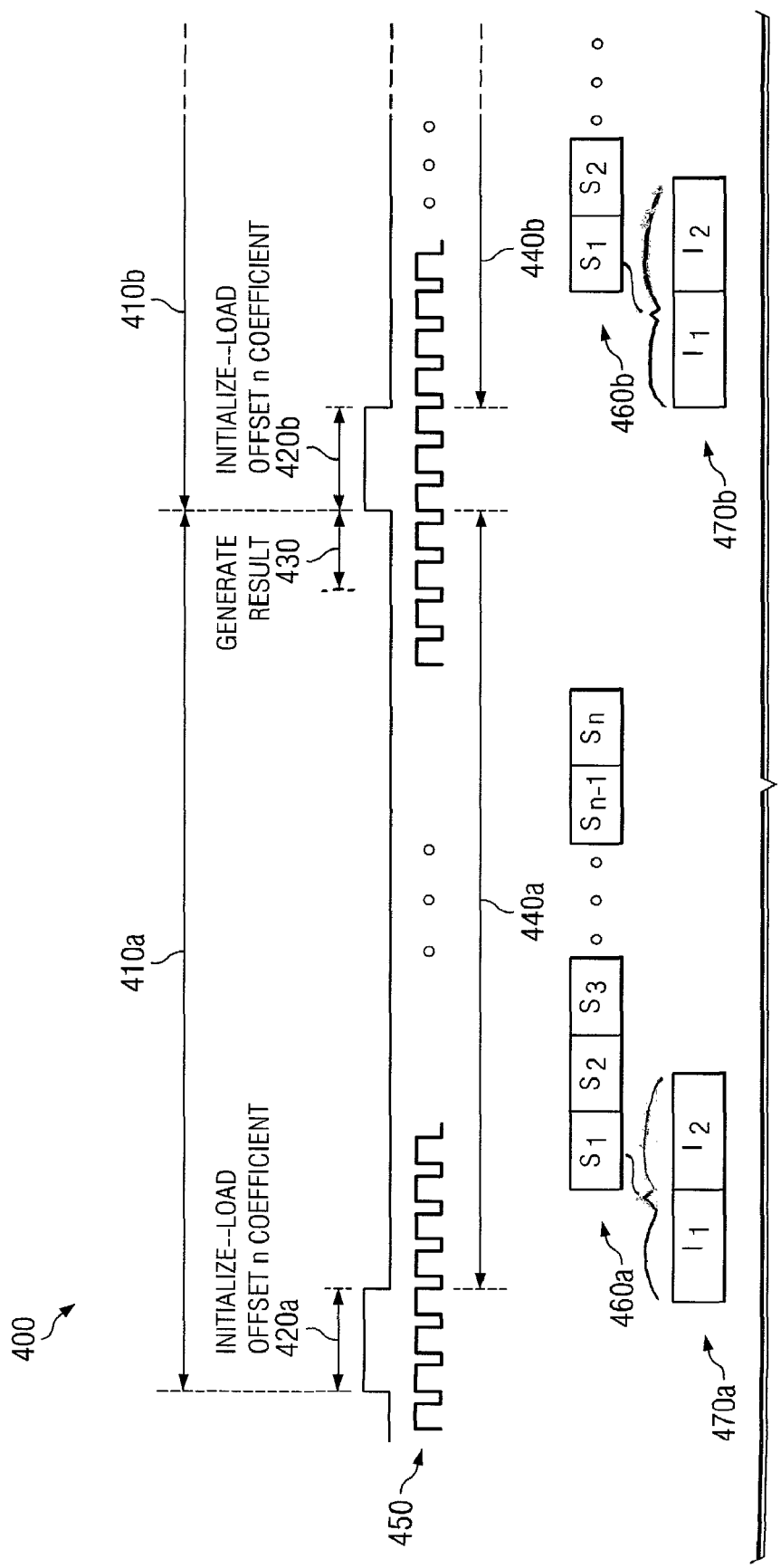
FIG. 4 is a timing diagram showing a process for corrected temperature measurement in accordance with various embodiments of the present invention.

Turning to FIG. 4, a timing diagram 400 depicts the process of applying a first current and a second current and detecting the corresponding Delta $V_{be,\ adjusted}$. The process of delta base-emitter voltage sampling is repeated during measurement periods 410 that each includes an initialization period 420, a sampling period 440 and a result generation period 430. During each period 410, a delta base-emitter voltage output is provided at the end of the period. During initialization period 420, a corrected n-factor is loaded into loadable counter 371. During sampling period 440, a number of samples 460 corresponding to the corrected n-factor are performed by repeatedly sampling and integrating the base-emitter voltage of a transistor corresponding to a first applied current, $I_1$ 470a, and a second applied current, $I_2$ 470a. At the end of measurement period 410, a result corresponding to Delta $V_{be,\ adjusted}$ is generated 430. This includes providing the integrated delta base-emitter voltage to a temperature calculation circuit where it is used to calculate circuit temperature.

Subsequently, another measurement period 410b is performed where a transistor is again repeatedly excited with the first current, $I_1$ 470b, and the second current, $I_2$ 470b. The loadable counter is again loaded with the corrected n-factor 420b, and the delta base-emitter voltage of the excited transistor is sampled and integrated 440b for a number of periods 460b corresponding to the corrected n-factor. After the sampling period is complete, a result corresponding to Delta $V_{be,\ adjusted}$ is generated 430. This includes providing the integrated delta base-emitter voltage to a temperature calculation circuit where it is again used to calculate circuit temperature.

Figure 5:
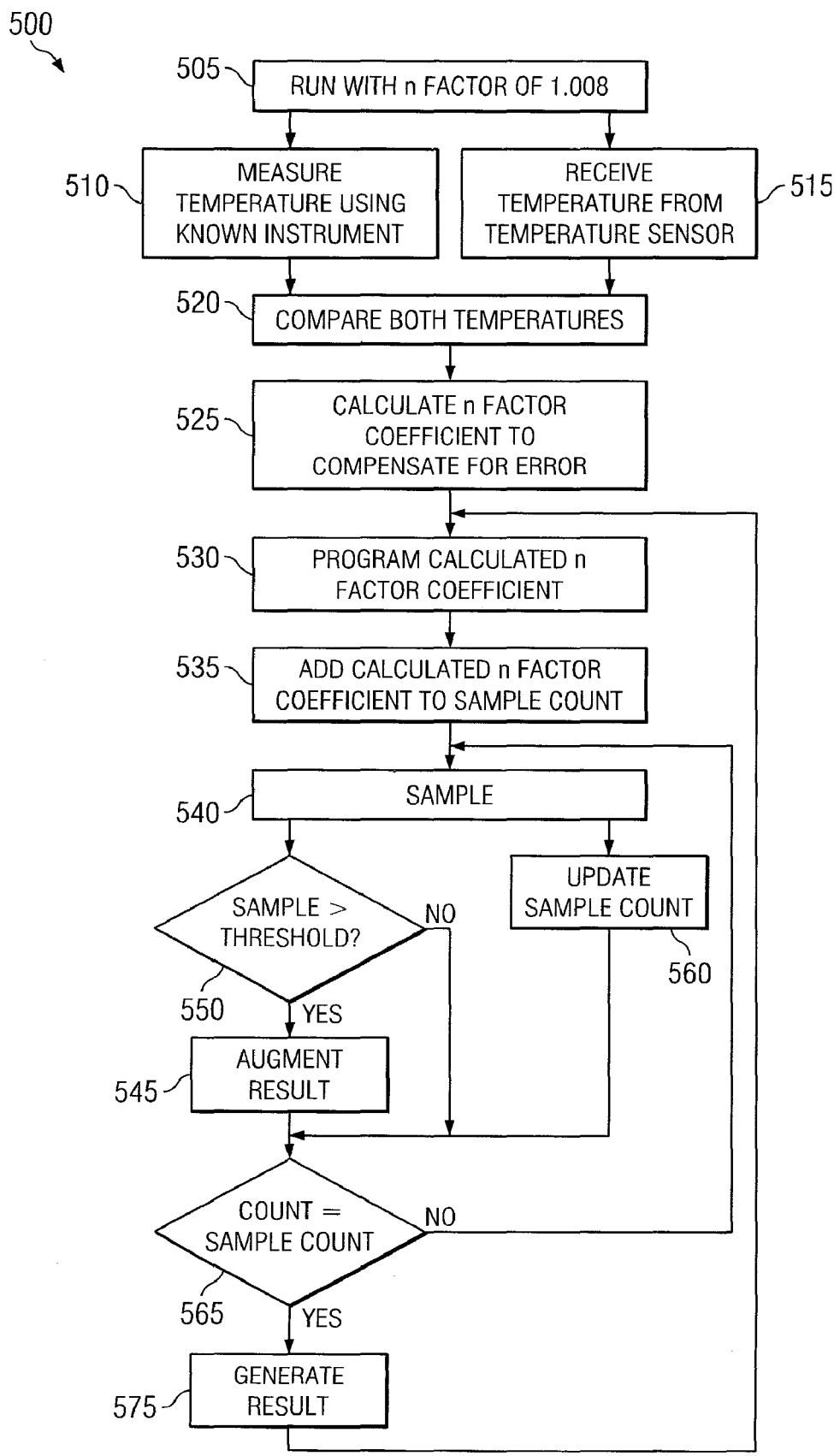
FIG. 5 is a flow diagram showing a method in accordance with embodiments of the present invention for performing temperature measurement.

Turning to FIG. 5, a flow diagram 500 depicts a method in accordance with one or more embodiments of the present invention for performing temperature measurement. A temperature measurement circuit such as that discussed in relation to FIG. 2 above is incorporated with a circuit or device on which temperature is to be measured. Flow diagram 500 is discussed in relation to temperature calculation circuit 200, but it should be noted that the process discussed in relation to flow diagram 500 may be used in relation to other temperature measurement circuit in accordance with embodiments of the present invention.

Following flow diagram 500, the circuit or device on which the temperature is to be measured is operated. During this initial operation, corrected n-factor 235 is operated with a number representing a standard n-factor value, 1.008 (block 505). In some cases, this includes operating the circuit or device with a zero value loaded into n-factor coefficient register 220. In particular, transistor 270 is repeatedly excited on subsequent sampling periods using a first current and then a second current. The difference between the base-emitter voltage of transistor 270 corresponding to the first current and the base emitter voltage corresponding to the second current is sampled. This sampling process is repeated a number of times corresponding to the standard n-factor value to measure the temperature of the operating device or circuit (block 515). At the same time, an accurate instrument external to the circuit or device is used to measure the actual temperature thereof (block 510). The temperature measured by the external measurement device and the temperature measured by temperature measurement circuit 200 are compared (block 520). The difference between the two temperatures is a temperature error.

An n-factor coefficient (i.e., $n_{adjust}$) is calculated that will adjust the gain of analog to digital converter 240 to compensate for the previously determined temperature error (block 525). The calculated n-factor coefficient is programmed into n-factor coefficient register 220 using two-wire interface 225 (block 530), and is combined with static n-factor value 210 to create corrected n-factor 235 (block 535). Corrected n-factor 535 corresponds to the number of samples to be taken of a base-emitter voltage.

Transistor 270 is excited using the first current and the second current, and the corresponding difference in the base-emitter voltage is sampled and converted (block 540). Each time a sample is obtained (block 540), a sample counter is incremented (block 560). In addition, the integrated sample value is compared with a threshold value (e.g., $V_{ref}$) (block 550). Where the integrated sample value exceeds the threshold value (block 550), a result is augmented (block 545). Augmenting the result may be done, for example, by incrementing a counter for each sample period that the integrated sample value exceeds the threshold value. Next, it is determined if the sample count equals corrected n-factor 235 (block 565). Where the sample count does not equal corrected n-factor 235 (block 560), the processes of blocks 540-565 are repeated for the second current. Otherwise, where the sample count does equal corrected n-factor 235 (block 560), the result is generated (block 575). The generated result represents the delta base-emitter voltage (the difference between the base-emitter voltage corresponding to the first current and the base-emitter voltage corresponding to the second current) measured using an analog to digital converter gain modified by $n_{adjust}$. Again, it should be noted that a similar process may be done using four or more currents and corresponding base-emitter voltages.

In conclusion, the present invention provides novel systems, devices, methods for temperature measurement. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A temperature measurement system, wherein the temperature measurement system comprises:
   a variable current source that is operable to provide a first current and a second current;
   a transistor that is electrically coupled to the variable current source, wherein a first base-emitter voltage occurs when the first current is applied to the transistor, and wherein a second base-emitter voltage occurs when the second current is applied to the transistor;
   an n-factor coefficient register that stores an n-factor adjustment, wherein the n-factor adjustment is based at least in part on a difference between a first temperature from an external measurement sensor and a second temperature calculated using the first and second base-emitter voltages;
   an adder that is coupled to the n-factor coefficient register, wherein the adder combines a standard n-factor with the n-factor adjustment to generate a corrected n-factor; and
   an analog to digital converter (ADC) that is coupled to the adder and to the transistor, wherein the ADC is operable to receive the first base-emitter voltage and the second base-emitter voltage, and wherein the ADC is operable to provide a digital output based at least in part on the corrected n-factor, the first base-emitter voltage, and the second base-emitter voltage.

2. The temperature measurement system of claim 1, wherein the transistor is diode connected.

3. The temperature measurement system of claim 1, wherein the temperature measurement circuit further comprises a temperature calculation module that is operable to calculate a temperature based on the digital output.

4. The temperature measurement system of claim 1, wherein the ADC is operable to perform a number of samples corresponding to the value stored in the n-factor coefficient register.

5. The temperature measurement system of claim 1, wherein the n-factor coefficient register is accessible via a two wire interface.

6. The temperature measurement system of claim 5, wherein the two wire interface includes a data line and a clock line.

7. The temperature measurement system of claim 1, wherein the gain of the ADC corresponds to the corrected n-factor.

8. The temperature measurement system of claim 7, wherein the ADC is a first order integrating converter, and wherein the number of samples processed by the first order integrating converter is controlled at least in part based on the value stored in the n-factor coefficient register.

9. The temperature measurement system of claim 8, wherein an ideal gain of the first order integrating converter is approximately three hundred.

10. The temperature measurement system of claim 8, wherein the first order integrating converter is a differential ADC.

11. A method for comprising:
    providing a temperature measurement circuit;
    determining a temperature error of a temperature reported by the measurement circuit, by:
      operating the temperature measurement circuit using a standard n-factor value;
      measuring a first temperature of the temperature measurement circuit using an external measurement sensor;
      calculating a second temperature of the temperature measurement circuit using a first base-emitter voltage and a second base-emitter voltage;
      calculating a difference between the first temperature and the second temperature;
    determining an n-factor adjustment to compensate for the temperature error based on the difference; and
    writing the n-factor adjustment to an n-factor coefficient register.

12. The method of claim 11, wherein the step of operating the temperature measurement circuit using a standard n-factor value further comprises operating the circuit with a zero value in the n-factor coefficient register.

13. The method of claim 11, wherein the step of operating the temperature measurement circuit using a standard n-factor value further comprises operating the circuit with the standard n-factor value in the n-factor coefficient register.

14. The method of claim 11, wherein the gain of an analog to digital converter corresponds to the n-factor adjustment.

15. The method of claim 14, wherein the n-factor adjustment is combined with the standard n-factor value, and wherein the combined value governs the gain of the analog to digital converter.

16. An apparatus comprising:
    a variable current source that provides a first current and a second current;
    a transistor that is electrically coupled to the variable current source, wherein a first base-emitter voltage occurs when the first current is applied to the transistor, and wherein a second base-emitter voltage occurs when the second current is applied to the transistor;

an n-factor coefficient register that stores an n-factor adjustment, wherein the n-factor adjustment is based at least in part on a difference between a first temperature from an external measurement sensor and a second temperature calculated using the first and second base-emitter voltages;

an first adder that is coupled to the n-factor coefficient register, wherein the adder combines a standard n-factor with the n-factor adjustment to generate a corrected n-factor;

an ADC including:
  a first switch that is coupled to the base of the transistor;
  a second switch that is coupled to the collector of the transistor;
  an amplifier;
  a capacitor that is coupled between the first and second switches and the amplifier;
  a comparator that is coupled to the amplifier and that receives a reference voltage;
  a second adder that is coupled to the comparator;
  a first counter that is coupled to the second adder;
  a second counter that is coupled to the first adder and the first counter; and
  a result register that is coupled to the first and second counters; and temperature calculation circuitry that is coupled to the result register.

17. The apparatus of claim 16, wherein the ADC further comprises:
  a third switch that receives the reference voltage;
  a fourth switch that is coupled to ground;
  a second capacitor that is coupled to the third and fourth switches and that is coupled to the amplifier;
  a fifth switch that is coupled between the second capacitor and the comparator;
  a sixth switch that is coupled to the second capacitor;
  a third capacitor that is coupled between the sixth switch and the comparator.

18. The apparatus of claim 16, wherein the transistor is diode connected.

* * * * *